No. 858,430. PATENTED JULY 2, 1907.
E. J. WHEELER.
BORING MACHINE.
APPLICATION FILED APR. 7, 1906.
2 SHEETS—SHEET 1.
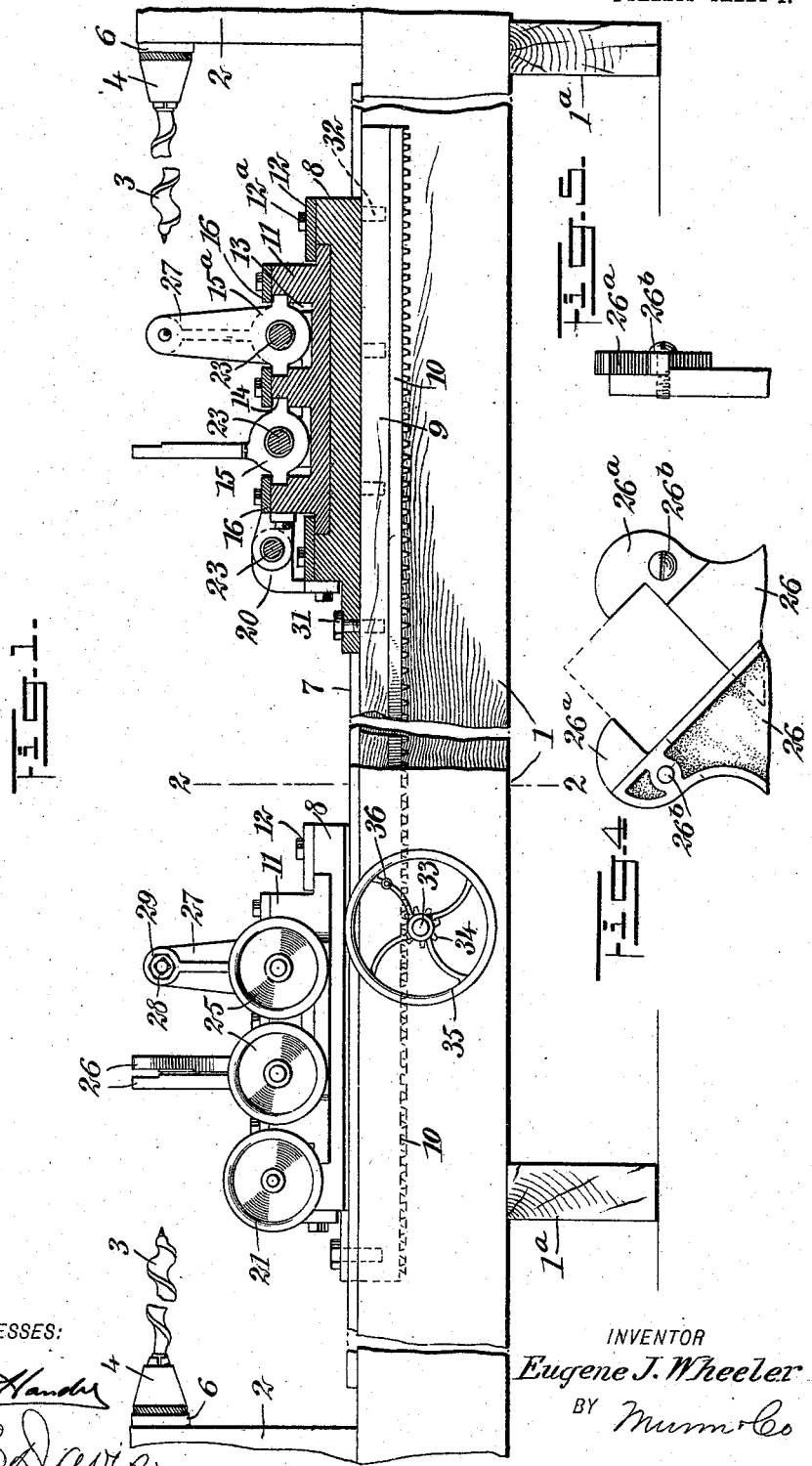
WITNESSES:
INVENTOR
Eugene J. Wheeler
BY
ATTORNEYS

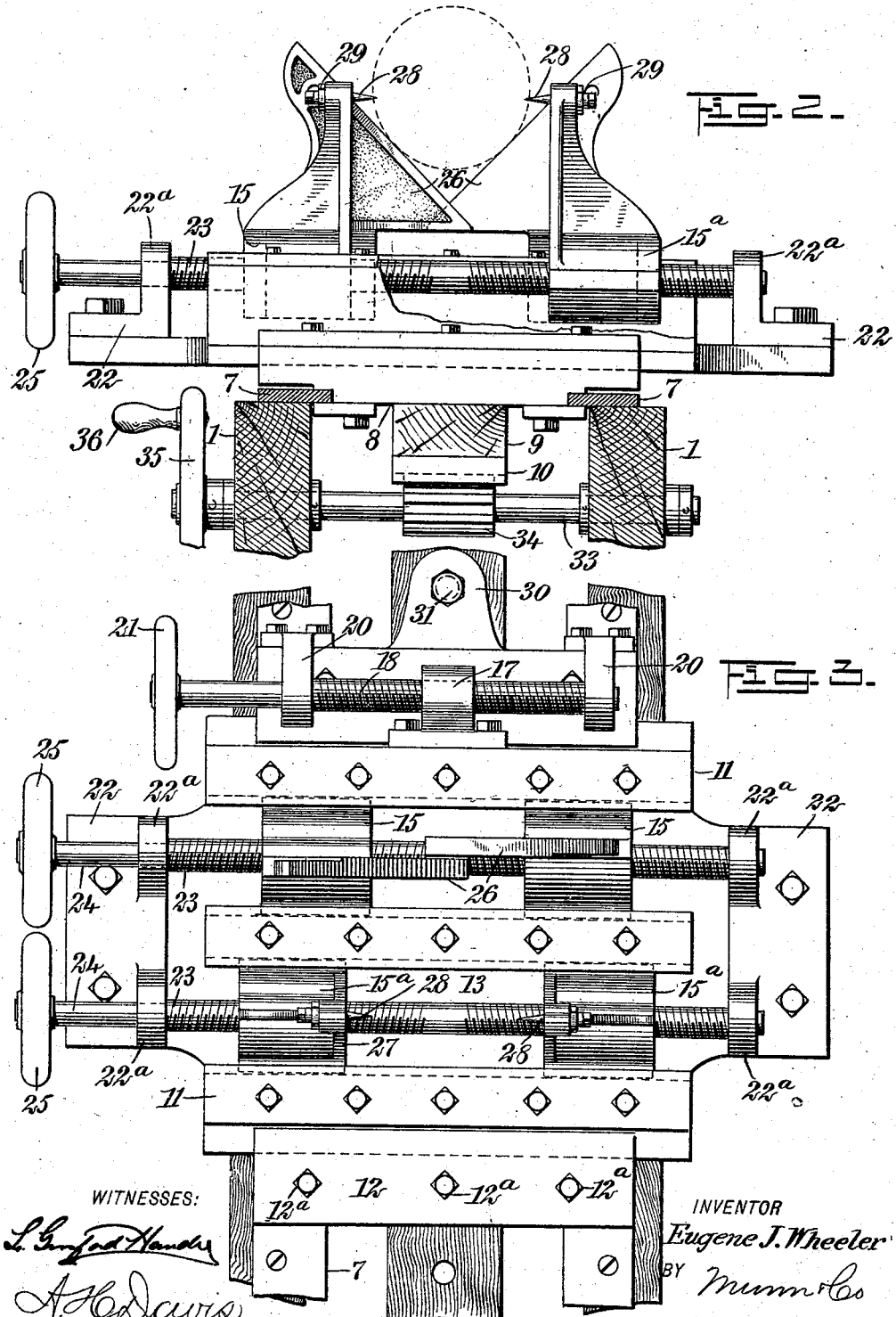

UNITED STATES PATENT OFFICE.

EUGENE J. WHEELER, OF BRYSON CITY, NORTH CAROLINA.

BORING-MACHINE.

No. 858,430.  Specification of Letters Patent.  Patented July 2, 1907.

Application filed April 7, 1906. Serial No. 310,532.

To all whom it may concern:

Be it known that I, EUGENE J. WHEELER, a citizen of the United States, and a resident of Bryson City, in the county of Swain and State of North Carolina, have invented a new and Improved Boring-Machine, of which the following is a full, clear, and exact description.

This invention is an improvement in boring machines and has for an object, among others, to provide a machine capable of accurately centering both square and round timbers at each end and holding them against rotary movement while the boring is accomplished.

Other objects of the invention are to provide a machine to bore both ends of a timber without the necessity of changing or shifting its ends in the machine, and to permit the centering and clamping means to move independently and transversely of the machine in order that the timber may be bored out of center when desired.

Reference is to be had to the accompanying drawings forming a part of this specification, in which similar characters of reference indicate corresponding parts in all the figures.

Figure 1 is a side elevation of my improved boring machine, partly broken away and in section at one end to more clearly show the clamping and centering mechanism; Fig. 2 is a transverse sectional view of the machine on the line 2—2 of Fig. 1 with the carriage broken away at one side, and showing in dotted lines a round timber as held by the jaws and dogs; Fig. 3 is a plan view of one of the carriages containing the holding and centering means; Fig. 4 is a side elevation of the centering and clamping jaws with attached clips for square timbers, a timber being shown in dotted position between the jaws, and Fig. 5 is an edge elevation of one of the jaws shown in Fig. 4 as viewed from the inside.

The numeral 1 indicates two longitudinal parallel beams spaced apart and supported on transverse beams 1ª, forming, respectively, a bed and supports for the machine. Fixed at each end of the bed of the machine is a standard 2 for carrying an auger 3 secured in a chuck 4 on a shaft 6 journaled in the standard at its upper end, and of any suitable construction. Slidably mounted on guide plates 7 secured to the upper face of the bed beams 1 and at each end of the machine, are tables 8 adjustably secured to a beam 9 having a rack 10 carried at its under face. Both tables 8 and the holding and centering mechanism carried by them are of identical construction, and hence a description of one will suffice for the other. The table 8 has planed transversely in its upper face a rectangular channel, in which slides a carriage 11 held in the channel by means of plates extending over the reduced edges and at each side of the carriage and secured by bolts 12ª to the table 8. The carriage 11 is provided in its upper face with two parallel channels 13, whose sides have rabbeted upper edges 14. On the upper face of the carriage 11 are bolted retaining plates 16 overhanging the rabbeted edges 14, and forming guides for the wings of nuts 15 and 15ª. At one side of the carriage 11 is bolted a screw-threaded lug 17 engaged by a screw 18 journaled in a bearing 20 bolted at each end of the table 8. The screw 18 has a shaft extension at one side of one of the bearings 20, to carry an operating hand wheel 21. Bolted or otherwise secured to the ends of the carriage 11 are plates 22 having upright lugs 22ª spaced apart and in alinement with the center of channels 13. Journaled at each end in the lugs 22ª are right and left screws threaded through the nuts 15 and 15ª, one nut engaging each thread of each screw and symmetrically disposed with respect to the carriage 11.

Screws 23 have shaft extensions 24 at one end with fixed hand-wheels 25 by which the screws are operated. To each nut 15 is attached or formed as an integral part thereof, centering and clamping jaws 26 having opposed inclined faces at an angle of about 45 degrees to each other. These jaws extend inwardly beyond the nuts and have their adjacent faces overlapping in sliding contact and in a vertical plane passing through the longitudinal center of the adjacent screw. Each jaw 26 is rabbeted at its upper end and has attached by a screw 26ᵇ a clip 26ª having jaws at right angles to the jaws 26, as shown in Fig. 4.

Carried on each nut 15ª are dogs consisting of supporting arms 27 T-shaped in cross section and having pointed pins 28 screwed into their upper ends and locked in place by jam nuts 29. At one side of the carriage 8 an integral projection 30 extends for adjustably attaching the carriage to the beam 9 by a screw 31 passing through the projection and into any one of a series of holes 32 in the beam.

Near the center of the machine in the bed beams 1 a shaft 33 is journaled, and has fixed to its center a pinion 34 meshing with the rack 10 and a hand-wheel 35 having a handle 36 fixed to its outer end, and at the same side of the machine as the hand-wheels 21 and 25.

In the operation, the tables 8 are adjusted to the center of the machine and the proper distance apart to correspond with the length of the timber to be bored. If the timber is square in cross section, the nuts 15ª carrying the dogs should be backed out from each other and may be removed from the machine. The timber is then placed in the jaws 26 and the latter operated to close and clamp the same, as shown in Fig. 4. By reciprocating the carriages by means of the rack and pinion 10 and 34, both ends of the timber are bored without removing it from the machine. In boring round timbers, the clips 26ª are removed from the jaws 26 and the latter operated to bring the center of the timber to the height of the auger 3. The dogs are then moved inwardly, forcing the steel points into the timber at each side and securely holding it in place, see Fig. 2. The timber is then bored in the same manner as the square timbers. If, for any reason, the timber is found to be defective or it is desired to bore it out of center, the carriages 11 and the jaws 26 may be moved by the screws 18 and 23 to bring the auger to the proper boring point.

It is not my intention to limit the invention to the exact details of construction hereinbefore described, but consider that I am entitled to such modifications as fall within a fair interpretation of the annexed claims.

Having thus described my invention I claim as new and desire to secure by Letters Patent:

1. In a boring machine, a bed, a table slidable on the bed, a carriage slidable on the table, guide-ways on the carriage, overlapping centering and clamping jaws slidable in one guide-way, dogs slidable in the other guide-way, and means for operating the jaws and dogs.

2. In a boring machine, a bed, a table slidable on the bed, centering jaws having overlapping sides carried at one side of the table, dogging jaws carried at the other side of the table, and means to simultaneously move either the centering or dogging jaws to or from each other.

3. In a boring machine, a bed, a table on the bed, centering and clamping jaws overlapping each other carried on the table, detachable clips at the ends of the jaws, and means to simultaneously move the jaws to and from each other.

In testimony whereof I have signed my name to this specification in the presence of two subscribing witnesses.

EUGENE J. WHEELER.

Witnesses:
O. P. WILLIAMS,
JNO. W. TALLEY.